US006785127B1

(12) United States Patent
Monney et al.

(10) Patent No.: US 6,785,127 B1
(45) Date of Patent: Aug. 31, 2004

(54) HANDHELD COMPUTER ATTACHMENT APPARATUS

(75) Inventors: Patrick Monney, Mex (CH); Denis Pavillard, Monnaz (CH); Jean-Marc Flueckiger, Lausanne (CH); Samer Abdo, Denges (CH); Andrew Switky, Menlo Park, CA (US); James Yurchenco, Palo Alto, CA (US); Kristine Rene Chan-Lizardo, Palo Alto, CA (US); Joe Watson, Los Gatos, CA (US); Chase Thompson, East Palo Alto, CA (US); Anthony Peter Patron, San Francisco, CA (US); Joseph W. Yang, Castro Valley, CA (US)

(73) Assignee: Logitech Europe S.A., Morges (CH)

( * ) Notice: Subject to any disclaimer, the term of this patent is extended or adjusted under 35 U.S.C. 154(b) by 0 days.

(21) Appl. No.: 10/256,661

(22) Filed: Sep. 27, 2002

Related U.S. Application Data
(60) Provisional application No. 60/350,104, filed on Oct. 19, 2001.

(51) Int. Cl.[7] .................................................. G06F 1/16
(52) U.S. Cl. ...................... 361/680; 345/905; 400/693; 364/708.1
(58) Field of Search .................................. 361/724–726, 361/679–687; 341/22; 345/168–172, 905; 235/145; 248/917; 400/489, 682, 691–693; 312/208.1, 208.4; 364/708.1

(56) References Cited

U.S. PATENT DOCUMENTS

| | | | | |
|---|---|---|---|---|
| 6,525,928 B1 | * | 2/2003 | Madsen et al. | 361/683 |
| 2002/0003874 A1 | * | 1/2002 | Peiker | 379/419 |
| 2002/0078248 A1 | * | 6/2002 | Janik et al. | 709/252 |

* cited by examiner

Primary Examiner—Hung Van Duong
(74) Attorney, Agent, or Firm—Townsend and Townsend and Crew LLP (57) ABSTRACT

Embodiments of the present invention are directed to an attachment apparatus for conveniently, securely, and releasably attaching a handheld device such as a handheld computer to a keyboard or other accessories. In some embodiments, the attachment apparatus is configured to be flexible or adjustable to accommodate differently sized handheld devices. In addition, an automatic switch on feature is implemented in some embodiments which allows the handheld device to be automatically switched on or off by manipulating the position of the attachment apparatus. In accordance with an aspect of the present invention, an apparatus for attaching a handheld device to a second device comprises an attachment device having a connector configured to be electrically connected to the handheld device. An adjustable mechanism is configured to adjustably connect the handheld device to the second device to move the handheld device relative to the second device between a first position and a second position. The attachment device includes a switch which is automatically activated to switch on the handheld device in the second position.

24 Claims, 10 Drawing Sheets

HANDHELD COMPUTER ATTACHMENT APPARATUS

CROSS-REFERENCES TO RELATED APPLICATIONS

This application is based on and claims the benefit of U.S. Provisional Patent Application No. 60/350,104, filed Oct. 19, 2001, the entire disclosure of which is incorporated herein by reference.

BACKGROUND OF THE INVENTION

The present invention relates to handheld devices such as handheld computers and, more particularly, to an attachment apparatus for releasably attaching a handheld device to a keyboard or other accessories.

Handheld devices such as personal digital assistants (PDAs) are finding wider use in different applications by a variety of users. In some instances, the PDA is connected to another device or accessory which compliments the PDA or expands its usage. For example, the PDA may be connected to a conventional keyboard, which may be full size or reduced size, to provide the user with ease of operation.

Some existing PDA attachment mechanisms are not convenient or easy to use. In addition, PDAs come in different sizes. Some PDA attachment mechanisms are designed for specific PDAs and cannot be used with differently sized PDAs.

SUMMARY OF THE INVENTION

Embodiments of the present invention are directed to an attachment apparatus for conveniently, securely, and releasably attaching a handheld device such as a handheld computer to a keyboard or other accessories. In some embodiments, the attachment apparatus is configured to be flexible or adjustable to accommodate differently sized handheld devices. In addition, an automatic switch on feature is implemented in some embodiments which allows the handheld device to be automatically switched on or off by manipulating the position of the attachment apparatus.

In accordance with an aspect of the present invention, an apparatus for attaching a handheld device to a second device comprises an attachment device having a connector configured to be electrically connected to the handheld device. An adjustable mechanism is configured to adjustably connect the handheld device to the second device to move the handheld device relative to the second device between a first position and a second position. The attachment device includes a switch which is automatically activated to switch on the handheld device in the second position.

In some embodiments, the switch is configured to be automatically activated by a force generated by the second device in the second position. The switch may be a reed switch which is configured to be disposed in close proximity to a magnet in the second device in the second position and to be automatically activated by a magnetic force generated by the magnet. The attachment device may be configured to be electrically connected to the second device.

In specific embodiments, the switch is automatically activated to switch on the handheld device and enable a driver in the handheld device for driving the second device in the second position. The second device is a keyboard and the driver is a keyboard driver for driving the keyboard. The adjustable mechanism is a foldable stand which is folded to position the handheld device against the second device in the first position and to position the handheld device in an upright position with respect to the second device in the second position. The switch may be automatically deactivated to switch off the handheld device in the first position.

In accordance with another aspect of the invention, a handheld device attachment apparatus comprises a body having a connector configured to connect with a handheld device. The connector is slidable in a first direction and a second direction opposite from the first direction. A spring is coupled with the connector to apply a spring biasing force to bias the connector toward the second direction. A locking member is configured to capture the handheld device during sliding of the handheld device in the first direction and to secure the handheld device in place under the spring biasing force applied by the spring on the handheld device through the connector toward the second direction.

In some embodiments, the locking member comprises a plurality of hooks configured to mate with slots of the handheld device during sliding of the handheld device in the first direction. The locking member may comprise at least one finger configured to capture an edge of the handheld device during sliding of the handheld device in the first direction. The spring biasing force pushes the edge of the handheld device against the at least one finger toward the second direction. The connector may be configured to electrically connect with the handheld device.

In accordance with another aspect of the present invention, a handheld device attachment apparatus comprises a body having a connector configured to connect with a handheld device. A locking member includes at least one flexible finger configured to capture an edge of the handheld device by resiliently bending in a first direction upon contact with the edge of the handheld device and to secure the handheld device in place. The connector of the body bears against the handheld device in the first direction during bending of the at least one flexible finger in the first direction.

In some embodiments, the connector of the body is configured to connect with another edge of the handheld device which is generally opposite from the edge of the handheld device to be captured by the at least one flexible finger. The locking member may be detachably coupled to the body and is replaceable by another, differently sized locking member. The locking member may be adjustably coupled to the body to change position relative to the connector of the body to accommodate differently sized handheld devices.

BRIEF DESCRIPTION OF THE DRAWINGS

FIG. 16 is an exploded perspective view of a handheld device attachment apparatus according to another embodiment of the present invention;

DESCRIPTION OF THE SPECIFIC EMBODIMENTS

Figure 1:
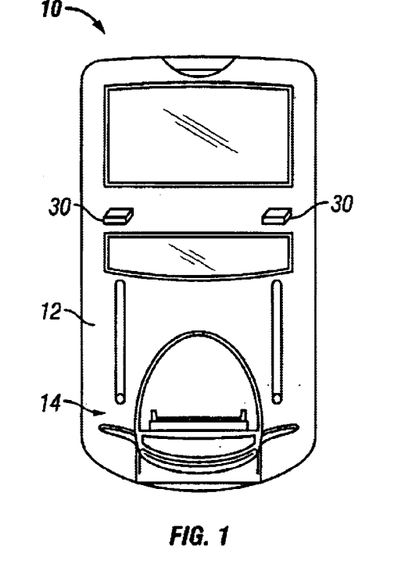
FIG. 1 is a front elevational view of a handheld device attachment apparatus according to an embodiment of the present invention.
Figure 1A:
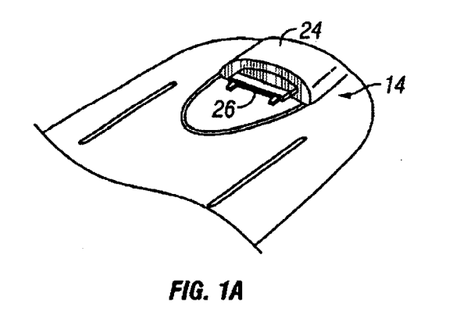
FIGS. 1A and 1B are perspective views of the handheld device attachment apparatus of FIG. 1.
Figure 1B:
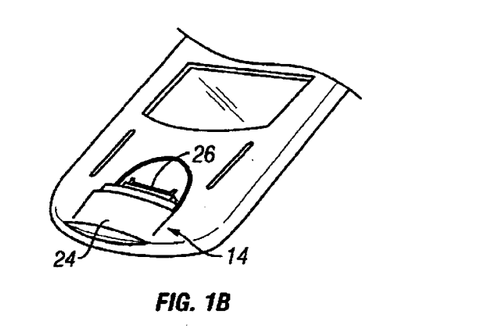
Figure 1C:
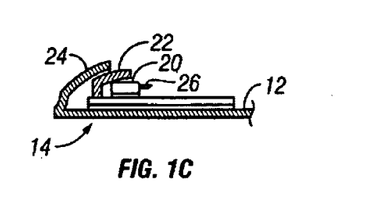
FIG. 1C is a cross-sectional view of a bottom portion of the handheld device attachment apparatus of FIG. 1.
Figure 2:
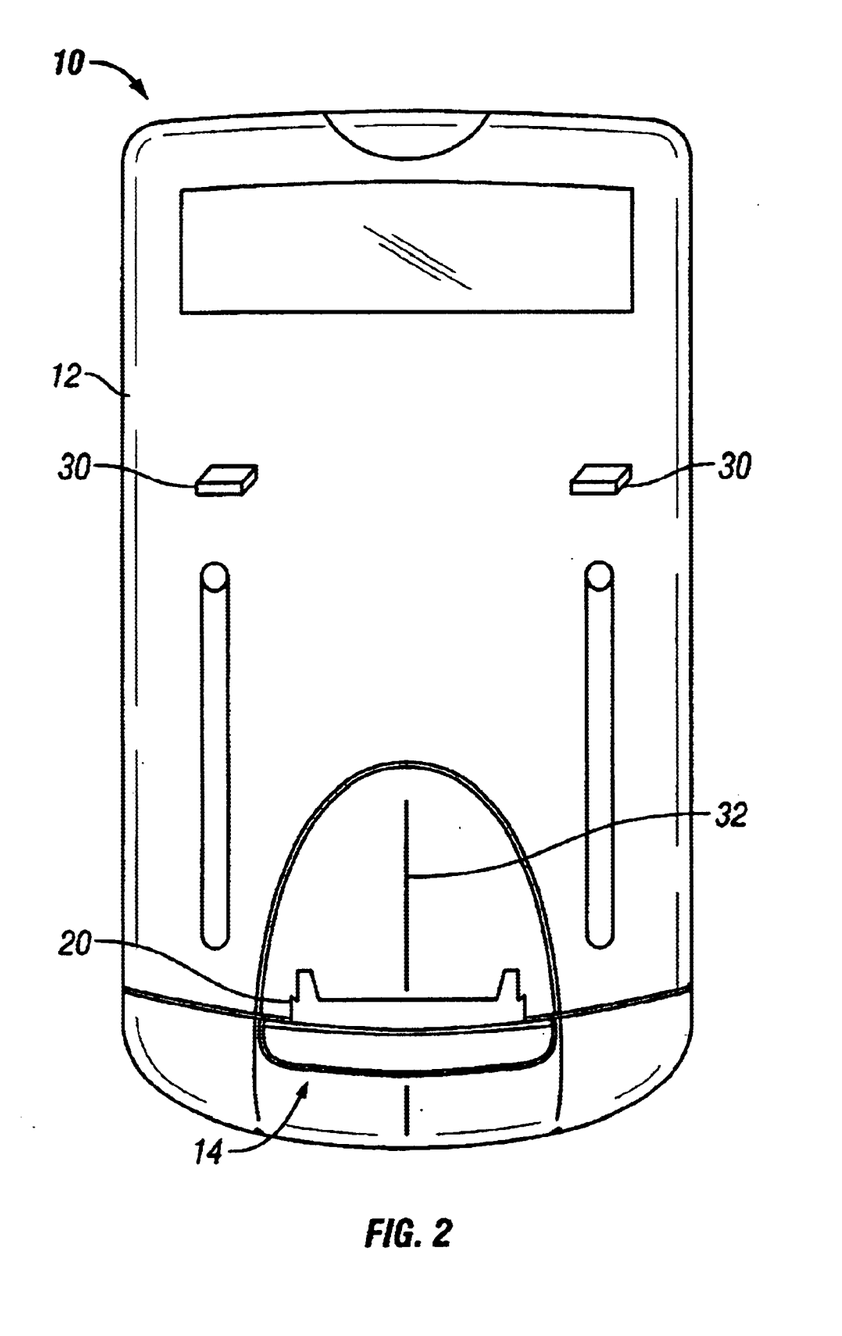
FIG. 2 is another front elevational view of the handheld device attachment apparatus of FIG. 1.
Figure 3:
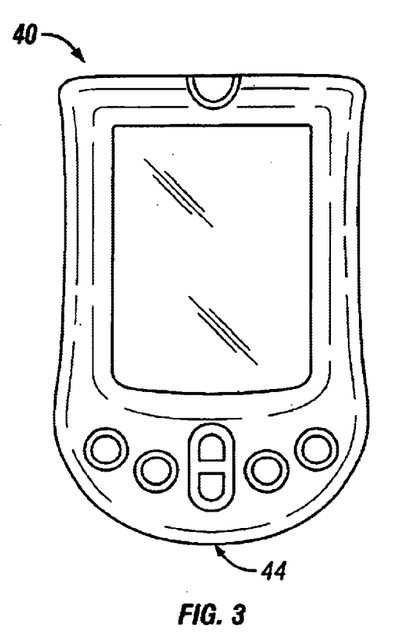
FIG. 3 is a front elevational view of a personal digital assistant (PDA)
Figure 4:
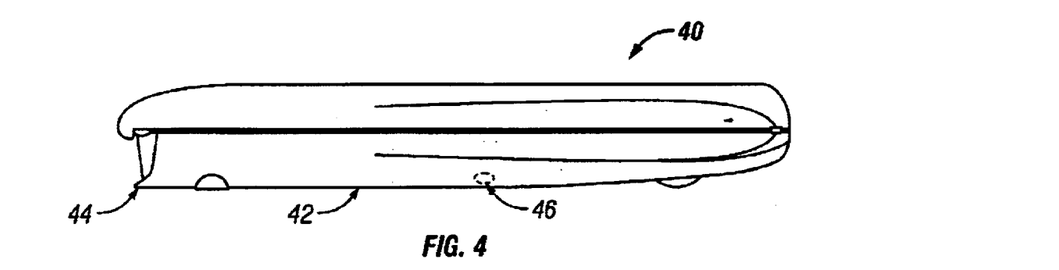
FIG. 4 is a side elevational view of the PDA of FIG. 3.
Figure 5:
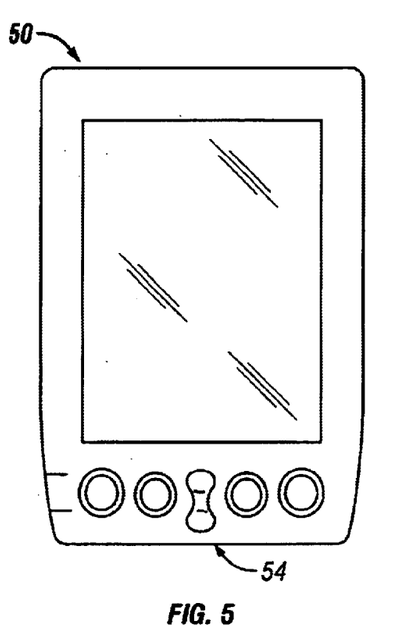
FIG. 5 is a front elevational view of another PDA.
Figure 6:
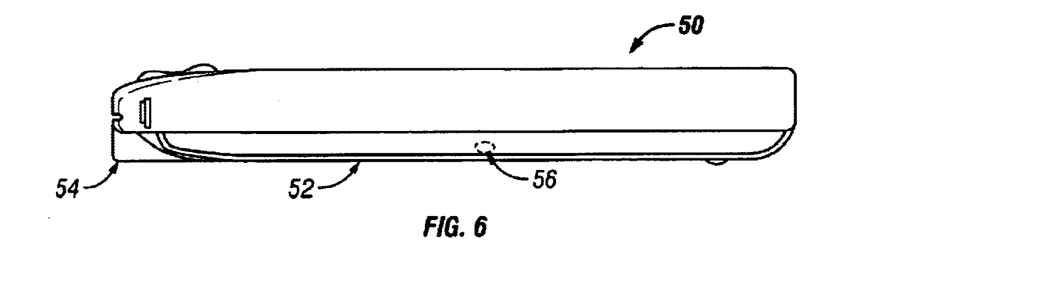
FIG. 6 is a side elevational view of the PDA of FIG. 5.

FIGS. 1–2 show one embodiment of a handheld device attachment apparatus 10 for a handheld computer, a personal digital assistant (PDA), or the like. The apparatus 10 includes a body 12 and a connection mechanism 14 in the lower region of the body 12. The body 12 has a generally planar support surface. The connection mechanism 14 includes a sliding bottom connector 20 which is slidable up and down the body 12. A spring 22 biases the connector 20 upward, and a bottom cover 24 at least partially covers the spring 22, as best seen in FIG. 1C. The connector 20 typically includes electrical connecting members such as contacts 26 for making electrical connection with the handheld device. As seen in FIGS. 1 and 2, the body 12 includes a pair of hooks or tabs 30 for coupling to the rear of the handheld device. A vertical slit or groove 32 may be provided on the body 12 above the connection mechanism 14 to guide the connection between the handheld device and the attachment apparatus 10.

FIGS. 3–6 show two PDAs as examples of handheld devices. The first PDA 40 has a generally planar rear surface 42 and a bottom connecting portion 44 which typically includes electrical connecting members or contacts. The rear surface 42 includes a pair of slots 46 for engaging the hooks 30 of the attachment apparatus 10. The second PDA 50 has a generally planar rear surface 52 and a bottom connecting portion 54 which typically includes electrical connecting members or contacts. The rear surface 52 includes a pair of slots 56 for engaging the hooks 30 of the attachment apparatus 10. The second PDA 50 is slightly longer than the first PDA 40.

To attach the PDA 40 (or 50) to the attachment apparatus 10, the bottom connecting portion 44 of the PDA 40 is mated with the connector 20 of the attachment apparatus 10, with the rear surface 42 facing the support surface of the body 12. The vertical groove 32 may serve as a landing guide for the PDA 40. A force is applied to push the PDA 40 downward on the connector 20 against the spring 22 to slide the PDA 40 downward relative to the attachment apparatus 10 until the hooks 30 of the apparatus 10 engage the slots 46 on the rear surface 42 of the PDA 40. After the downward force is removed, the spring 22 pushes the PDA 40 upward to secure the connection between the hooks 30 and the slots 46.

To disconnect the PDA 40 from the attachment apparatus 10, the PDA 40 is pushed downward against the spring 22 to disengage the hooks 30 from the slots 46. The PDA 40 is then tilted forward and lifted upward to detach the connecting portion 44 of the PDA 40 from the connector 20 of the attachment apparatus 10.

FIGS. 7–17 show additional embodiments of the attachment apparatus.

Figure 7:
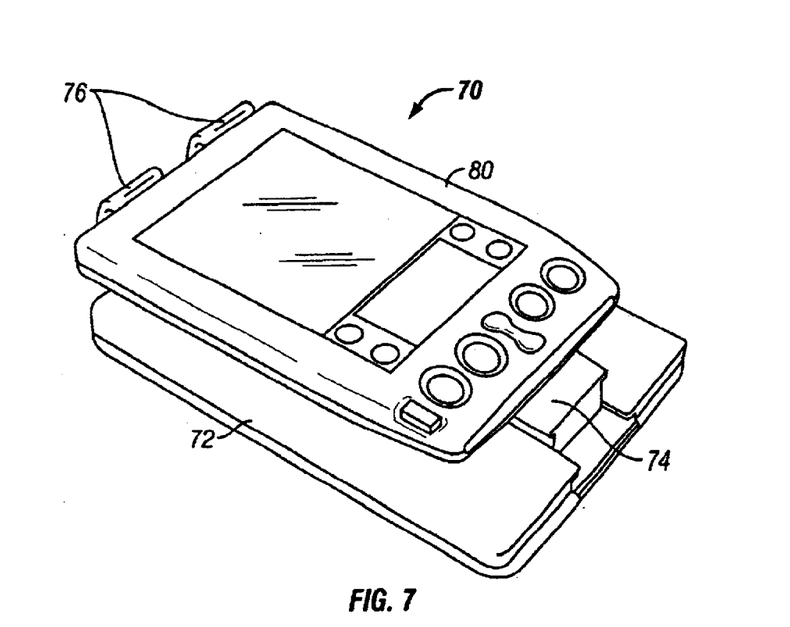
FIG. 7 is a perspective view of a handheld device attachment apparatus according to another embodiment of the present invention.

The attachment apparatus 70 in FIG. 7 includes a body 72 and a spring-loaded connection mechanism 74 similar to that in the attachment apparatus 10 of FIGS. 1–2. Instead of hooks for engaging slots on the rear surface of the PDA, the attachment apparatus 70 has one or more fingers 76 in the top region of the body 72. FIG. 7 shows two fingers 76. The fingers 76 are typically rigid or substantially rigid, and are curved to capture the top edge of the PDA 80.

Figure 8:
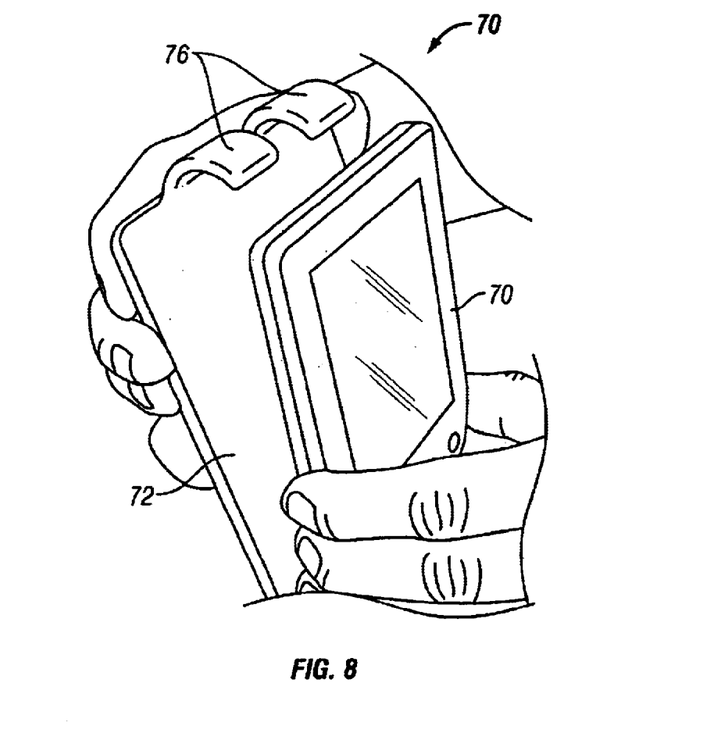
FIG. 8 is another perspective view of the handheld device attachment apparatus of FIG. 7 illustrating attachment of a PDA thereto.

To attach the PDA 80 to the attachment apparatus 70, the bottom of the PDA 80 is pushed downward against the spring-loaded connection mechanism 74 until the top edge of the PDA 80 clears the fingers 76 of the apparatus 70, as seen in FIG. 8. The downward force on the PDA 80 is then released to allow the spring-loaded connection mechanism 74 to push the PDA 80 upward against the fingers 76 to secure the connection. To disconnect the PDA 80 from the attachment apparatus 70, the PDA 80 is pushed downward against the spring-loaded connection mechanism 74 to disengage the fingers 76 from the top edge of the PDA 80. The PDA 80 is then tilted forward and lifted upward to detach the bottom portion of the PDA 80 from the connection mechanism 74 of the attachment apparatus 70. The spring-loaded connection mechanism 74 may accommodate PDAs of slight different sizes by deforming the spring by different amounts.

Figure 9:
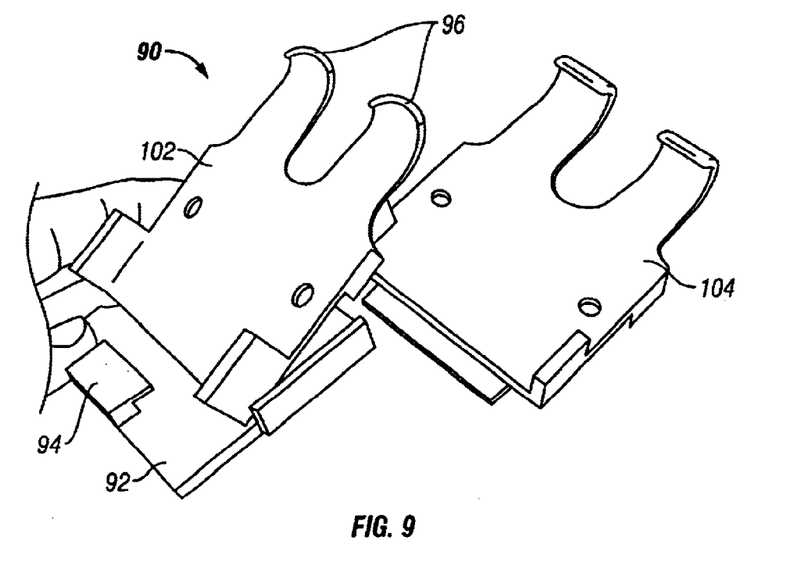
FIG. 9 is a perspective view of a handheld device attachment apparatus according to another embodiment of the present invention.
Figure 10:
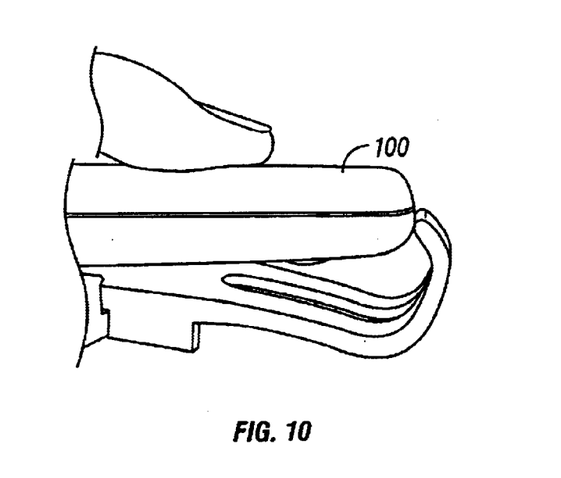
FIG. 10 is a side elevational view of the handheld device attachment apparatus of FIG. 9 illustrating attachment of a PDA thereto.
Figure 11:
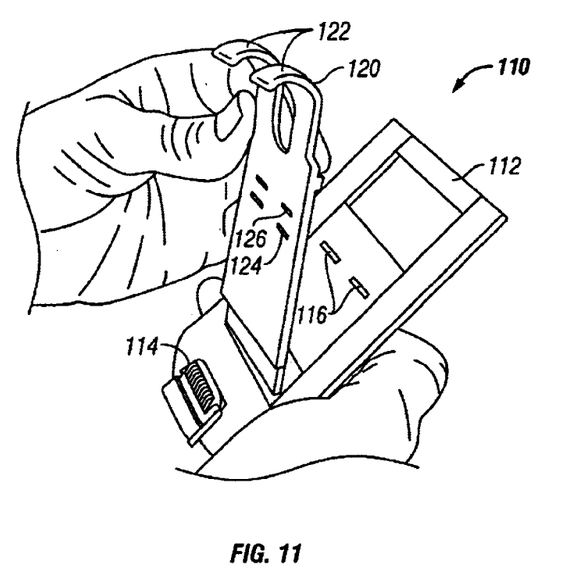
FIG. 11 is a perspective view of a handheld device attachment apparatus according to another embodiment of the present invention.

FIGS. 9 and 10 illustrate another embodiment of an attachment apparatus 90 which employs a fixed connector 94 and flexible fingers 96. The fixed connector 94 is not spring-loaded, but the fingers 96 are flexible so that they deform by bending to capture the top edge of the PDA 100 after the bottom portion of the PDA 100 is engaged with the fixed connector 94, as seen in FIG. 10. The flexible fingers 96 deform to allow the top edge of the PDA 100 to disengage for removing the PDA 100 from the attachment apparatus 90. To accommodate PDAs of different sizes, the body or frame 92 of the attachment mechanism 90 may be configured to receive differently sized finger modules which include the flexible fingers. FIG. 9 shows two interchangeable finger modules 102, 104 which can be releasably coupled to the body 92, for instance, by fasteners. In this way, the same body 92 of the attachment apparatus 90 can be used for different PDAs by selecting and connecting the appropriate finger module to the body 92.

In the embodiment shown in FIGS. 11–15, an adjustable finger module is used to replace multiple finger modules of the previous embodiment of FIGS. 9 and 10 for receiving differently sized handheld devices. The attachment apparatus 110 includes a body or frame 112 with a connector 114 and a pair of hooks or tabs 116. An adjustable finger module 120 includes a pair of flexible fingers 122 at the top, a pair of lower slots 124, and a pair of upper slots 126. The vertical position of the finger module 120 with respect to the frame 112 is adjustable by mating the hooks 116 with either the lower slots 124 or the upper slots 126. This allows a single adjustable finger module 120 to be used with a frame 112 for attaching differently sized PDAs or the like.

Figure 12:
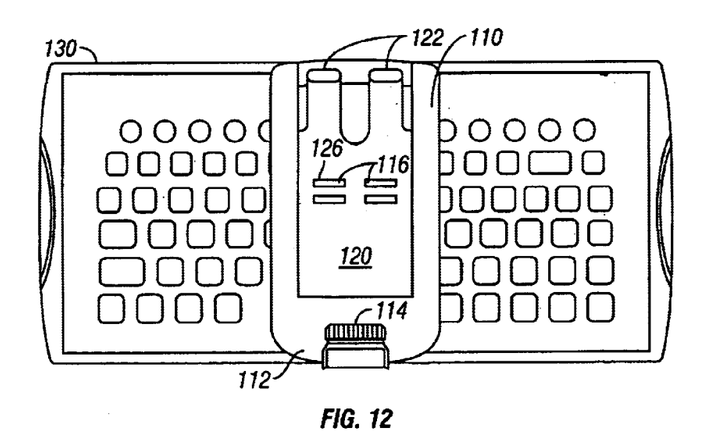
FIG. 12 is a front elevational view of the handheld device attachment apparatus of FIG. 11 mounted to a keyboard in a folded position.
Figure 13:
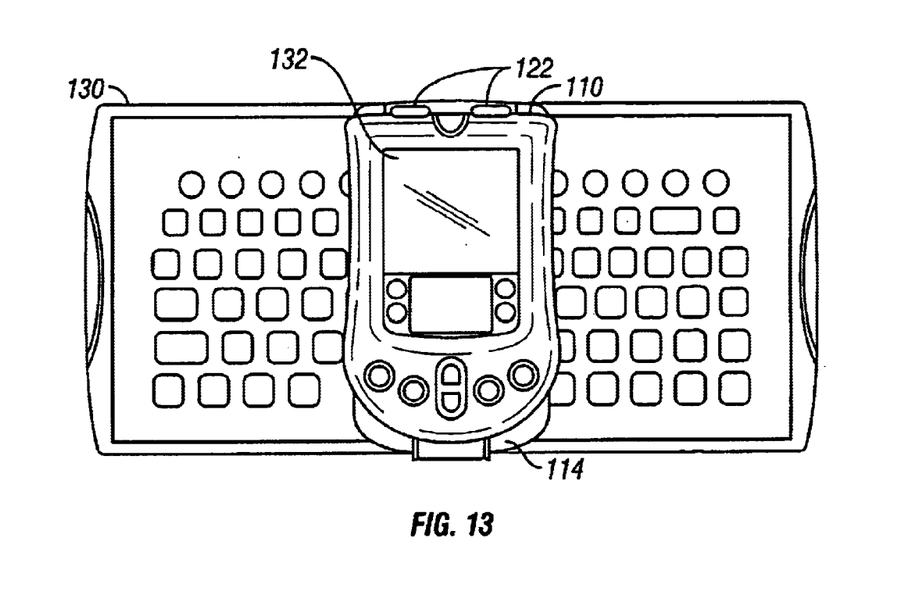
FIG. 13 is a front elevational view of a PDA connected to the handheld device attachment apparatus and keyboard of FIG. 12.
Figure 14:
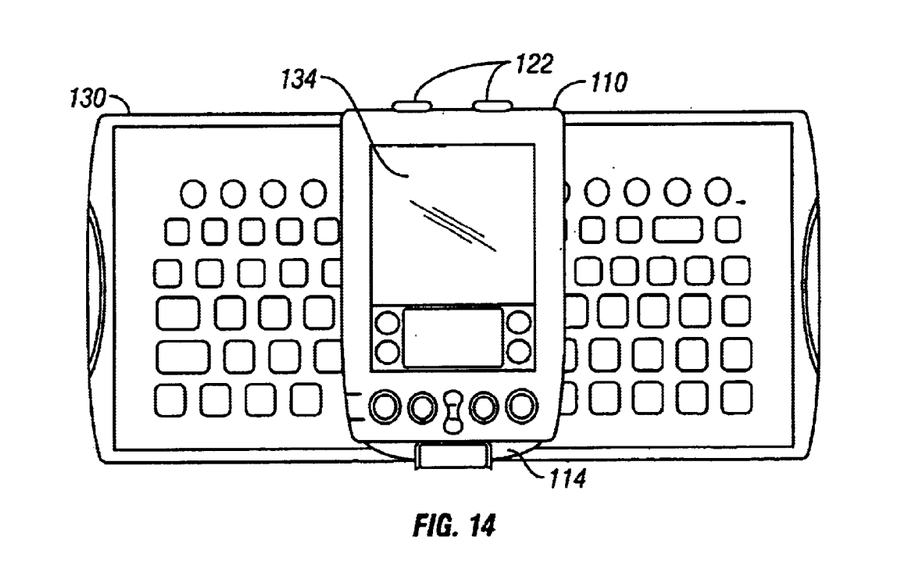
FIG. 14 is a front elevational view of another PDA connected to the handheld device attachment apparatus and keyboard of FIG. 12.

FIG. 12 shows the attachment apparatus 110 mounted to a keyboard 130. The adjustable finger module 120 is coupled to the frame 112 by connecting the hooks 116 with the upper slots 126. FIG. 13 shows a PDA 132 attached at the bottom to the connector 114 of the frame 112 and at the top to the flexible fingers 122 of the finger module 120. In FIG. 14, the adjustable finger module 120 is moved upward by connecting the hooks 116 with the lower slots 124 to receive a larger PDA 134. The PDA 134 is attached at the bottom to the connector 114 of the frame 112 and at the top to the flexible fingers 122 of the finger module 120. The keyboard 130 may be folded around the PDA 132 or 134 disposed in the middle from the right and left sides to protect the PDA and facilitate convenient handling and storage. The frame of the keyboard 130 may be made of a flexible material such as a fabric.

FIGS. 15–17A illustrate other embodiments of adjustable finger modules.

Figure 15:
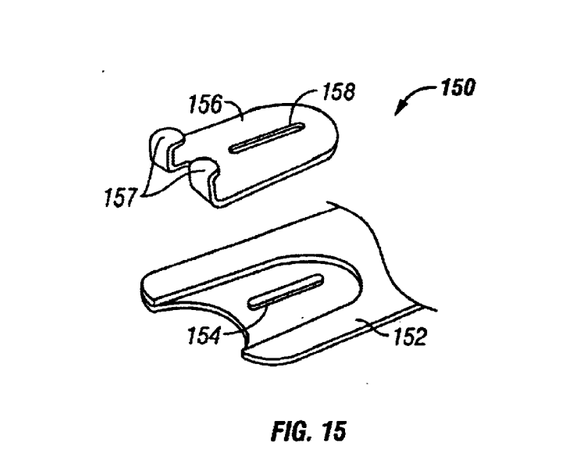
FIG. 15 is an exploded perspective view of a handheld device attachment apparatus according to another embodiment of the present invention.
Figure 15A:
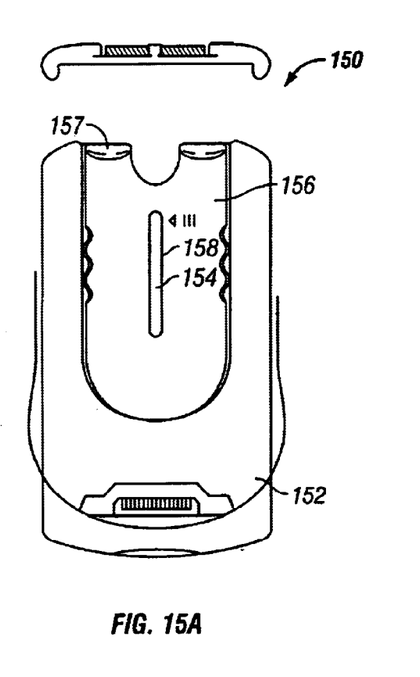
FIGS. 15A and 15B are front elevational views of the handheld device attachment apparatus of FIG. 15.
Figure 15B:
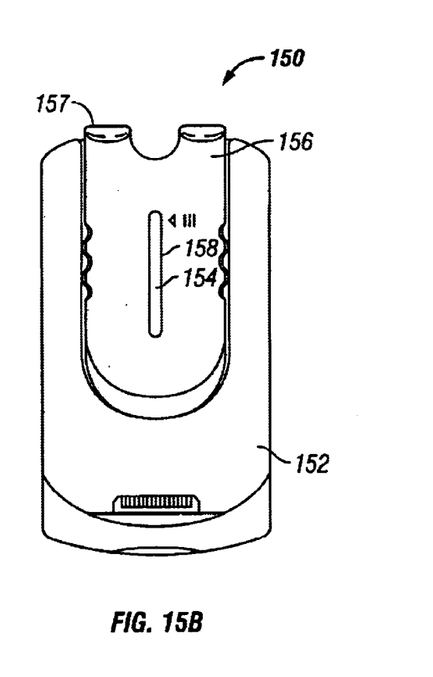

In FIGS. 15–15B, the attachment apparatus 150 includes a body or frame 152 having a vertical bar or rib 154. The adjustable finger module 156 includes flexible fingers 157 and a vertical slot or groove 158. The vertical slot or groove 158 mates with the vertical rib 154 and is longer than the vertical rib 154 to allow vertical adjustment of the finger module 156 with respect to the frame 152, as illustrated in FIGS. 15A and 15B. For a through slot 158, the position of the vertical rib 154 is visible from the front.

Figure 16A:
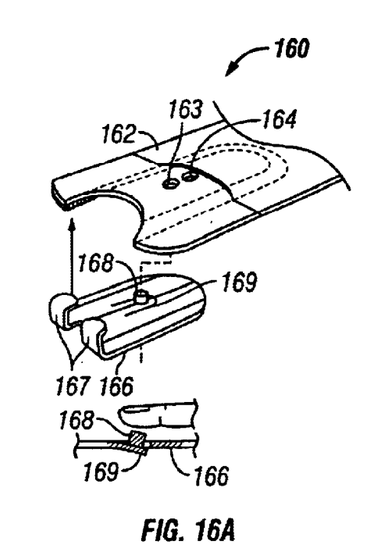
FIG. 16A is a cross-sectional view of a movable knob in the handheld device attachment apparatus of FIG. 16.
Figure 16B:
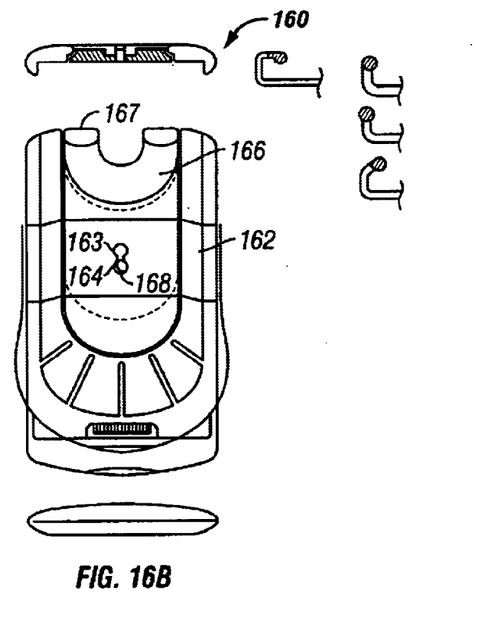
FIG. 16B is a front elevational view of the handheld device attachment apparatus of FIG. 16.

FIGS. 16–16B show an attachment apparatus 160 which includes a body or frame 162 having an upper aperture 163 and a lower aperture 164. An adjustable finger module 166 includes flexible fingers 167 and a tab or knob 168 disposed on a partial cut-out 169 which serves as a spring for supporting the knob 168. The knob 168 is configured to mate with the upper aperture 163 or the lower aperture 164 to adjust the position of the finger module 166 with respect to the frame 162. As best seen in FIG. 16A, the spring-like cut-out 169 deflects relative to the finger module 166 under pressure applied on the knob 168. FIG. 16B shows the knob 168 mated with the lower aperture 164. To disconnect the knob 168 from the lower aperture 164, the knob 168 is pushed rearward as illustrated in FIG. 16A. The knob 168 returns to the original position upon removal of the force. When coupled with either the upper aperture 163 or the lower aperture 164, the knob 168 is visible from the front.

Figure 17:
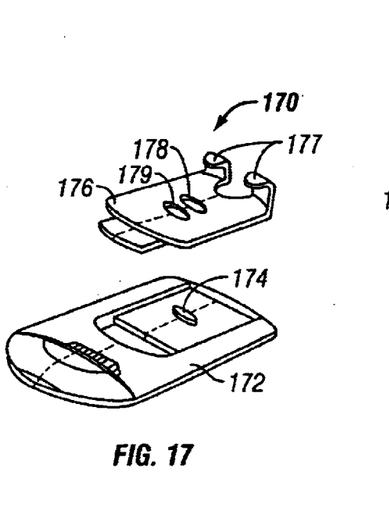
FIG. 17 is an exploded perspective view of a handheld device attachment apparatus according to another embodiment of the present invention.
Figure 17A:
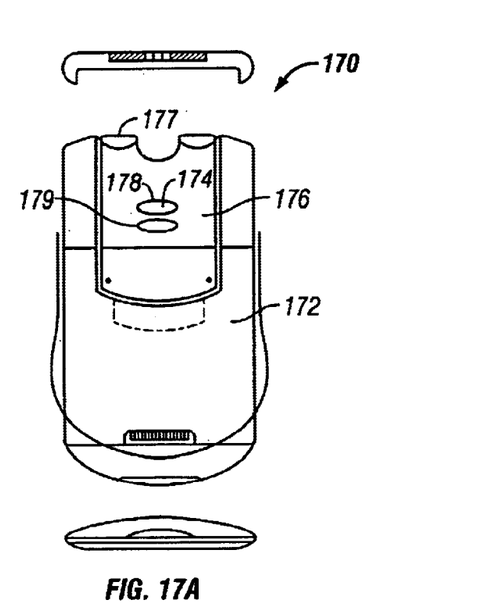
FIGS. 17A is a front elevational view of the handheld device attachment apparatus of FIG. 17.

In FIGS. 17 and 17A, the attachment apparatus 170 includes a body or frame 172 having a tab or boss 174. The adjustable finger module 176 includes flexible fingers 177, an upper aperture 178, and a lower aperture 179. The boss 174 is configured to mate with the upper aperture 178 or the lower aperture 179 to adjust the position of the finger module 176 with respect to the frame 172. In FIG. 17A, the boss 174 is connected with the upper aperture 178. When coupled with either the upper aperture 178 or the lower aperture 179, the boss 174 is visible from the front.

Figure 18:
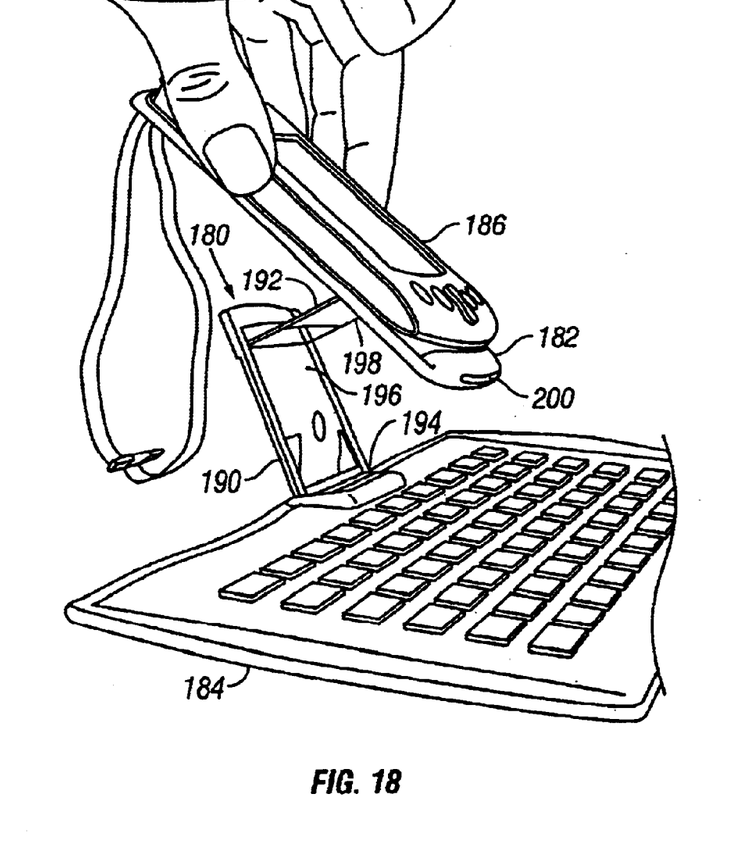
FIG. 18 is a perspective view of a foldable stand for supporting a handheld device attachment apparatus according to an embodiment of the present invention.
Figure 19:
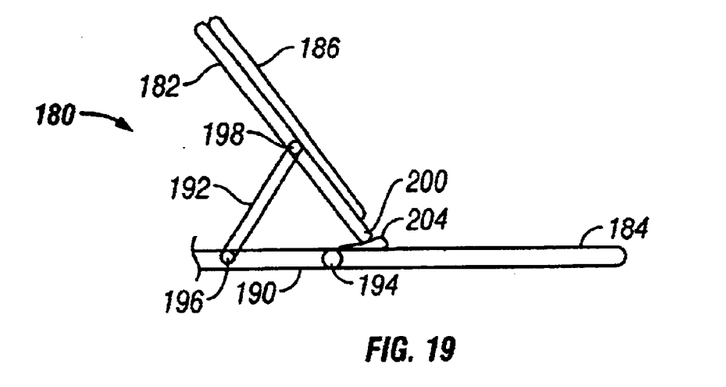
FIG. 19 is a side elevational view of the foldable stand of FIG. 18 for supporting the handheld device attachment apparatus in an upright position.

From the folded or flat position shown in FIGS. 13 or 14, the PDA can be moved to an erect or upright position, as illustrated in FIGS. 18 and 19. A foldable stand 180 attaches the handheld device attachment apparatus 182 to the accessory 184. In FIG. 18, the handheld device is a PDA 186 and the accessory is a keyboard 184. The foldable stand 180 includes a base 190 and a back support 192. The base 190 is pivotally connected to the keyboard 184 at connection 194. The back support 192 is pivotally connected to the base 190 at connection 196, and pivotally connected to the attachment apparatus 182 at connection 198. In the folded position, both the base 190 and the back support 192 lie flat on the keyboard 184. When the foldable stand 180 is lifted from the keyboard 184, the base 190 rotates around the pivot connection 194 rearward with respect to the keyboard 184, and the back support 192 rotates around the pivot connection 196 forward with respect to the base 190, as seen in FIGS. 18 and 19. FIG. 19 shows the foldable stand 180 in the upright position.

In some embodiments, the foldable stand 180 incorporates an automatic switch on or wakeup feature for the PDA 186 when it moves to the upright position. In the embodiments of FIGS. 18 and 19, the attachment apparatus 182 includes a switch 200 at the bottom which is automatically activated to switch on or wake up the PDA 186 when the bottom of the attachment apparatus 182 is supported by the keyboard 184 in the upright position. The mechanism for activating the switch 200 may be mechanical, electrical, magnetic, or the like. In a specific embodiment, the switch 200 is a reed switch which can be activated by a magnetic force generated by a magnet 204 provided on the keyboard 184 when the reed switch 200 rests on the keyboard 184 in close proximity of the magnet 204. The switch 200 is activated to automatically turn on the PDA 186 and enable the keyboard driver for the keyboard 184. The PDA 186 may be automatically switched off when the switch 200 is deactivated as the PDA 186 is moved back by folding the foldable stand 180 to the folded position.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. An apparatus for attaching a handheld device to a second device, the apparatus comprising:

an attachment device having a connector configured to be electrically connected to the handheld device; and an adjustable mechanism which is configured to adjustably connect the attachment device to move the attachment device relative to the second device between a first position and a second position, wherein the attachment device includes a switch which is automatically activated to switch on the handheld device in the second position.

2. The apparatus of claim 1 wherein the switch is configured to be automatically activated by a force generated by the second device in the second position.

3. The apparatus of claim 1 wherein the attachment device is configured to be electrically connected to the second device.

4. The apparatus of claim 1 wherein the adjustable mechanism is a foldable stand which is folded to position the handheld device against the second device in the first position the handheld device in an upright position with respect to the second device in the second position.

5. The apparatus of claim 1 wherein the switch is automatically deactivated to switch off the handheld device in the first position.

6. The apparatus of claim 2 wherein the switch is reed switch which is configured to be disposed in close proximity to a magnet in the second device in the second position and to be automatically activated by a magnetic force generated by the magnet.

7. The apparatus of claim 3 wherein the switch is automatically activated to switch on the handheld device and enable a driver in the handheld device for driving the second device in the second position.

8. The apparatus of claim 7 wherein the second device is a keyboard and the driver is a keyboard driver for driving the keyboard.

9. A handheld device attachment apparatus comprising:
a body having a connector configured to connect with a handheld device, the connector being slidable in a first direction and a second direction opposite from the first direction;
a spring coupled with the connector to apply a spring biasing force to bias the connector toward the second direction; and
a locking member configured to capture the handheld device during sliding of the handheld device in the first direction and to secure the handheld device in place under the spring biasing force applied by the spring on the handheld device through the connector toward the second direction.

10. The handheld device attachment apparatus of claim 9 wherein the locking member comprises a plurality of hooks configured to mate with slots of the handheld device during sliding of the handheld device in the first direction.

11. The handheld device attachment apparatus of claim 9 wherein the locking member comprises at least one finger configured to capture an edge of the handheld device during sliding of the handheld device in the first direction, the spring biasing force pushing the edge of the handheld device against the at least one finger toward the second direction.

12. The handheld device attachment apparatus of claim 9 wherein the connector is configured to electrically connect with the handheld device.

13. A handheld device attachment apparatus comprising:
a body having a connector configured to connect with a handheld device; and
a locking member including at least one flexible finger configured to capture an edge of the handheld device by resiliently bending in a first direction upon contact with the edge of the handheld device and to secure the handheld device in place, the connector of the body bearing against the handheld device in the first direction during bending of the at least one flexible finger in the first direction.

14. The handheld device attachment apparatus of claim 13 wherein the connector of the body is configured to connect with another edge of the handheld device which is generally opposite from the edge of the handheld device to be captured by the at least one flexible finger.

15. The handheld device attachment apparatus of claim 13 wherein the locking member is detachably coupled to the body and is replaceable by another, differently sized locking member.

16. The handheld device attachment apparatus of claim 13 wherein the locking member is adjustably coupled to the body to change position relative to the connector of the body to accommodate differently sized handheld devices.

17. The handheld device attachment apparatus of claim 16 wherein the body includes at least one hook and the locking member includes at least one lower slot and at least one upper slot, the at least one hook being releasably connectable with the at least one lower slot and the at least one upper slot to change position of the locking member relative to the connector of the body.

18. The handheld device attachment apparatus of claim 16 wherein the body includes a rib and the locking member includes a slot which is longer than the rib, the rib being slidable along the slot to change position of the locking member relative to the connector of the body.

19. The handheld device attachment apparatus of claim 16 wherein the body includes an upper aperture and a lower aperture and the locking member includes a knob which is releasably connectable with the upper aperture and the lower aperture to change position of the locking member relative to the connector of the body.

20. The handheld device attachment apparatus of claim 16 wherein the body includes a boss and the locking member includes an upper aperture and a lower aperture, the boss being releasably connectable with the upper aperture and the lower aperture to change position of the locking member relative to the connector of the body.

21. The handheld device attachment apparatus of claim 19 wherein the knob is disposed on a partial cut-out of the locking member which is resiliently deflectable.

22. An apparatus for attaching a handheld device to a second device, the apparatus comprising:
an attachment device having a connector configured to be electrically connected to the handheld device; and
an adjustable mechanism which is configured to adjustably connect the handheld device to the second device to move the handheld device relative to the second device between a first position and a second position,
wherein the attachment device includes a switch which is automatically activated to switch on the handheld device in the second position;
wherein the switch is configured to be automatically activated by a force generated by the second device in the second position; and
wherein the switch is a reed switch which is configured to be disposed in close proximity to a magnet in the second device in the second position and to be automatically activated by a magnetic force generated by the magnet.

23. An apparatus for attaching a handheld device to a second device, the apparatus comprising:
an attachment device having a connector configured to be electrically connected to the handheld device; and
an adjustable mechanism which is configured to adjustably connect the handheld device to the second device to move the handheld device relative to the second device between a first position and a second position, wherein the attachment device includes a switch which is automatically activated to switch on the handheld device in the second position;

wherein the attachment device is configured to be electrically connected to the second device;

wherein the switch is automatically activated to switch on the handheld device and enable a driver in the handheld device for driving the second device in the second position; and wherein the second device is a keyboard and the driver is a keyboard driver for driving the keyboard.

24. An apparatus for attaching a handheld device to a second device, the apparatus comprising:

an attachment device having a connector configured to be electrically connected to the handheld device; and an adjustable mechanism which is configured to adjustably connect the handheld device to the second device to move the handheld device relative to the second device between a first position and a second position, wherein the attachment device includes a switch which is automatically activated to switch on the handheld device in the second position; and wherein the adjustable mechanism is a foldable stand which is folded to position the handheld device against the second device in the first position and to position the handheld device in an upright position with respect to the second device in the second position.

* * * * *